US007624124B2

(12) United States Patent
Shinke et al.

(10) Patent No.: US 7,624,124 B2
(45) Date of Patent: Nov. 24, 2009

(54) SYSTEM AND METHOD FOR ASSISTING GENERATION OF BUSINESS SPECIFICATION

(75) Inventors: Hirofumi Shinke, Yokohama (JP); Takashi Kashimoto, Yokohama (JP); Kazuyuki Aoyama, Akishima (JP)

(73) Assignee: Hitachi, Ltd., Tokyo (JP)

( * ) Notice: Subject to any disclaimer, the term of this patent is extended or adjusted under 35 U.S.C. 154(b) by 181 days.

(21) Appl. No.: 11/332,631

(22) Filed: Jan. 13, 2006

(65) Prior Publication Data
US 2006/0224555 A1 Oct. 5, 2006

(30) Foreign Application Priority Data
Apr. 1, 2005 (JP) .............................. 2005-105598

(51) Int. Cl.
G06F 7/00 (2006.01)
G06F 17/00 (2006.01)
(52) U.S. Cl. .................................. 707/104.1; 707/100
(58) Field of Classification Search ................. 707/100, 707/104.1
See application file for complete search history.

(56) References Cited

U.S. PATENT DOCUMENTS

| 5,963,965 | A * | 10/1999 | Vogel ........................ 715/236 |
| 6,327,699 | B1 * | 12/2001 | Larus et al. .................. 717/128 |
| 6,643,638 | B1 * | 11/2003 | Xu ................................ 707/3 |
| 2001/0011295 | A1 * | 8/2001 | Kobayashi et al. .......... 709/201 |
| 2004/0163020 | A1 * | 8/2004 | Sidman ....................... 714/100 |
| 2004/0210685 | A1 * | 10/2004 | Orofino et al. ................ 710/22 |

FOREIGN PATENT DOCUMENTS

JP 09-101884 4/1997

OTHER PUBLICATIONS

Harrison et al, "Mapping UML Designs to Java", Proceedings from the 15th ACM SIGPLAN Conference on Object-Oriented Programming, Systems, Languages, and Applications (OOPSLA), Oct. 2000, pp. 178-188 (11 pages).*
Sinha et al, "YAML: A Tool for Hardware Design Visualization and Capture", Proceedings of the 13th International Symposium on System Synthesis (ISSS), Sep. 2000, pp. 9-14 (6 pages).*
She et al, "A Geographic Information System (GIS)-Based Bridge Management System", Computer-Aided Civil and Infrastructure Engineering, Blackwell Publishers, 1999, pp. 417-427 (11 pages).*

* cited by examiner

*Primary Examiner*—James Trujillo
*Assistant Examiner*—Marc Somers
(74) *Attorney, Agent, or Firm*—Townsend and Townsend and Crew LLP

(57) ABSTRACT

A business specification generation assisting system for generation of a business specification that implements a business function specified by a user, on the basis of association among the business functions, programs and physical data is provided. A physical model which is a graph having programs and input and output physical data as vertexes, a business model which is a graph having business functions and input and output logical data as vertexes, and an association model including an association table of business functions with program functions and an association table of logical data with physical data are stored. With respect to a business function specified by the user, an associated physical model is analyzed, and subgraphs associated with the business function are calculated and displayed. The business model and the association model are modified according to a modification order given by the user.

16 Claims, 10 Drawing Sheets

FIG.3

PROGRAM TABLE 60

| PROGRAM | MARK |
|---|---|
| PGM-x | ○ |
| PGM-y | ○ |
| PGM-z | ○ |

63 : 64

PHYSICAL DATA TABLE 61

| DATA | MARK |
|---|---|
| FILE-a | ○ |
| FILE-b | △ |
| FILE-c | ○ |

65 : 66

PHYSICAL I/O RELATION TABLE 62

| PROGRAM | DATA | I/O CLASSIFICATION |
|---|---|---|
| PGM-x | FILE-a | In |
| PGM-x | FILE-b | In |
| PGM-x | FILE-n | Out |
| PGM-x | FILE-m | Out |

BUSINESS I/O RELATION TABLE 82

| BUSINESS FUNCTION | LOGICAL DATA | I/O CLASSIFICATION |
|---|---|---|
| ORDER RECEIVING REGISTRATION | ORDER RECEIVING | In |
| ORDER RECEIVING REGISTRATION | PERSON IN CHARGE | In |
| ORDER RECEIVING REGISTRATION | ORDER RECEIVING SLIP | Out |
|  |  |  |

DATA ASSOCIATION TABLE 91

| LOGICAL DATA | PHYSICAL DATA |
|---|---|
| ORDER RECEIVING | FILE-a |
| PERSON IN CHARGE |  |
| ORDER RECEIVING SLIP | FILE-c |

97 — ORDER RECEIVING
98 — PERSON IN CHARGE

93 : 94

FUNCTION ASSOCIATION TABLE 92

| BUSINESS FUNCTION | PROGRAM |
|---|---|
| ORDER RECEIVING REGISTRATION | PGM-x |
| ORDER RECEIVING REGISTRATION | PGM-z |
| ORDER RECEIVING REGISTRATION | PGM-w |

95 : 96

SYSTEM AND METHOD FOR ASSISTING GENERATION OF BUSINESS SPECIFICATION

INCORPORATION BY REFERENCE

The present application claims priority from Japanese application JP 2005-105598 filed on Apr. 1, 2005, the content of which is hereby incorporated by reference into this application.

BACKGROUND OF THE INVENTION

The present invention relates to a business specification generation assisting system for analyzing a program used in an information system and assisting comprehension of the program.

The reverse engineering assisting system for assisting comprehension of an information system by analyzing a program used in an information system is widely used.

In general, however, specification extraction processing for an information system using analysis of assets is effective for the purpose of extracting low level specification information close to a computer system. However, the specification extraction processing is not effective for the purpose of extracting a high level specification close to business. This is because there is a limit in mechanically giving meaning to a program by conducting analysis. For business comprehension of an information system, it is necessary for a worker to conduct semantic analysis work on information obtained by analysis. As a technique for assisting such work, for example, JP-A-9-101884 discloses a technique for assisting a worker in the process of adding semantic information to hierarchized information such as a module structure or a syntax structure of a program.

A set of processing programs that have meaning in business is not necessarily managed as a cluster of structures of the information system. There is a limit in such a way of giving meaning to existing structures. For example, it is considered that a series of instructions having meaning as a whole are written simply as a part of a source program and there are not especially syntax punctuations before and after the instructions.

SUMMARY OF THE INVENTION

An object of the present invention is to provide a business specification generation assisting system for assisting generation of a business specification that implements a specified business function on the basis of association among the business functions, programs and physical data.

In order to achieve the object, the present invention adopts a configuration including a physical model database for storing input and output relations between programs to be analyzed and physical data, a business model database for storing association of the business functions with logical data, and an association model database for storing association of the physical data with the logical data and association of the business functions with programs used to execute the business functions, wherein a relation between a previously specified business function and physical data associated with the business function is indicated on the basis of information stored in those databases.

According to the present invention, it is possible to assist generation of a business specification that implements a business function specified by the user, on the basis of the relation between the physical data and the program.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing an example of data tables of a physical model 22;

FIG. 4 is a diagram showing an example of a data table of a business model 24;

FIG. 5 is a diagram showing an example of data tables of an association model 23;

DESCRIPTION OF THE EMBODIMENTS

Hereafter, an embodiment of the present invention will be described in detail with reference to the drawings.

Figure 1:
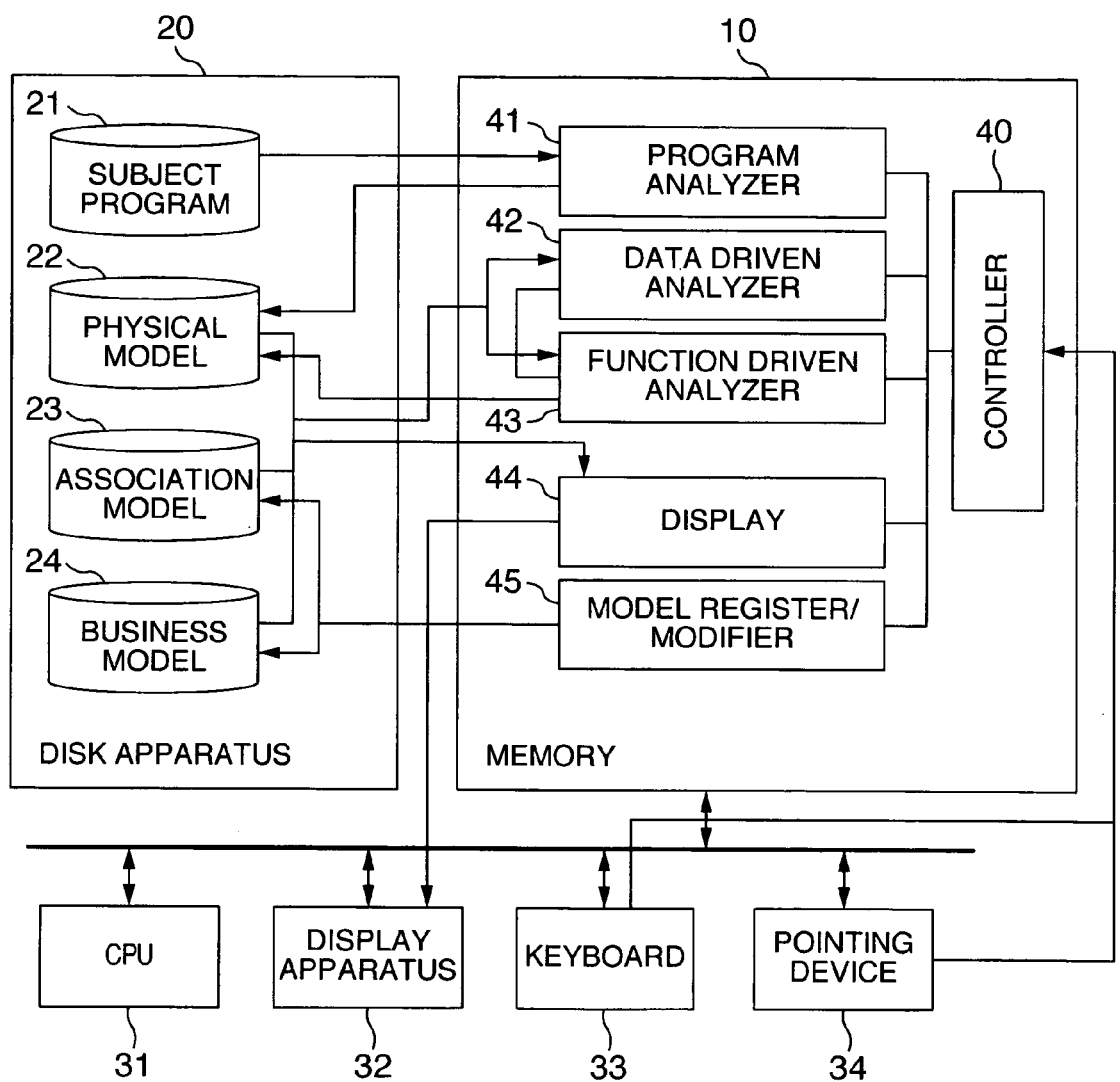
FIG. 1 is a system configuration diagram of a business specification generation assisting system which is an embodiment of the present invention.

FIG. 1 shows a configuration diagram of a business specification generation assisting system which is an embodiment of the present invention. The present system includes a CPU 31, a display apparatus 32, a keyboard 33, a pointing device 34 such as a mouse, a disk apparatus 20, and a memory 10, which are connected to each other via a bus or the like. The memory 10 includes programs of a controller 40, a program analyzer 41, a data driven analyzer 42, a function driven analyzer 43, a display unit 44 and a model register/modifier 45. The disk apparatus 20 includes databases of a subject program 21, a physical model 22, an association model 23 and a business model 24.

The subject program 21 is a set of programs that are analysis subjects of the system shown in FIG. 1. Here, "program" means an arbitrary description that defines a procedure, such as a description of a job control language, the whole of a source program written using a general purpose program language, or its part such as a function or a procedure. In particular, a sequence of specific executable statements in a program depending upon the environment at the time of execution and the value of input data may be defined as a "program."

Figure 2:
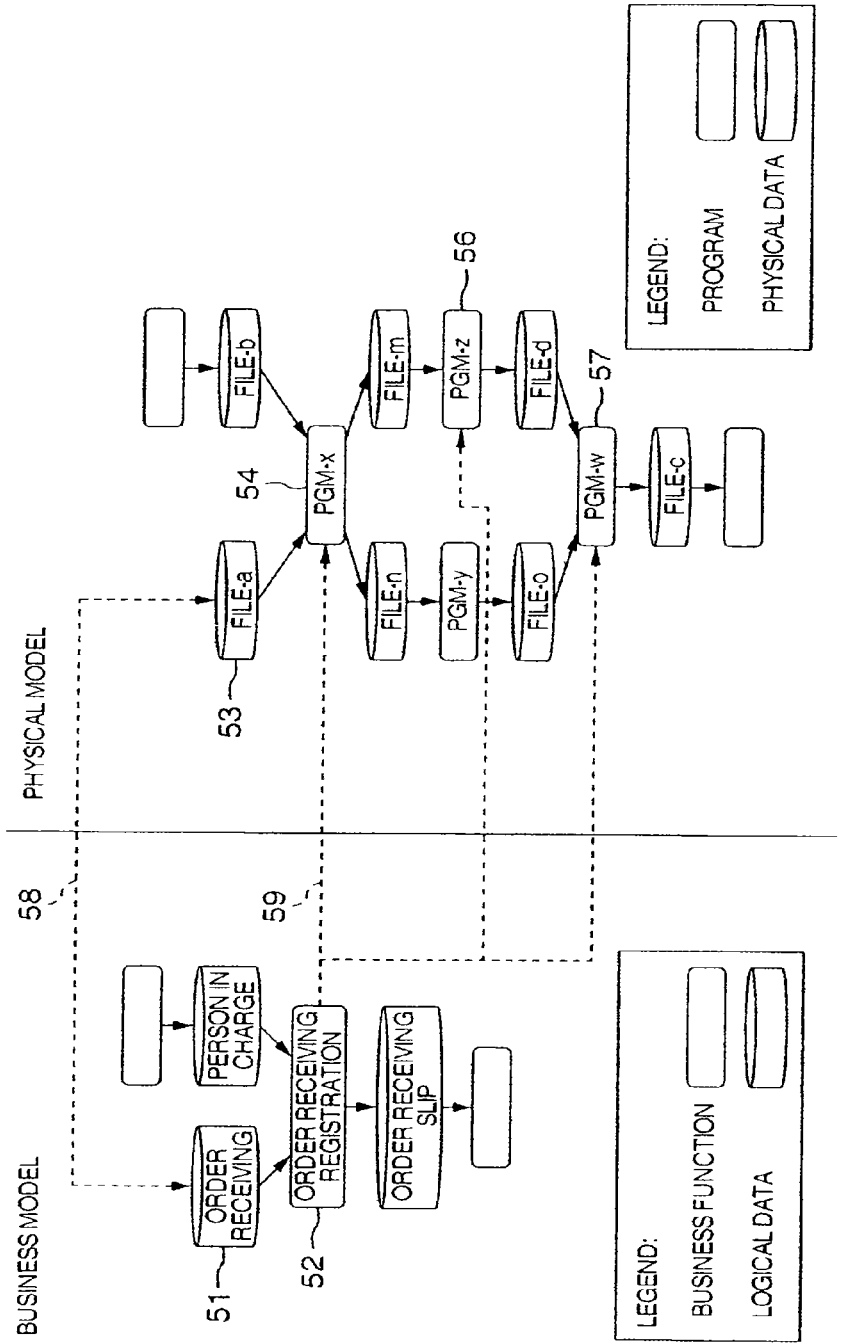
FIG. 2 is a diagram showing graph structures of a business model 24, a physical model 22, and an association model 23.

FIG. 2 is a diagram showing graph structures of a physical model 22 and a business model 24. In the graph structure of the physical model (shown on the right-hand side of FIG. 2), the vertex of a graph is a program 54 or physical data 53. The physical data 53 is arbitrary one such as a record, or a variable, a file or a table in a program which stores a set of records. The program vertex and the physical data vertex are connected to each other by a directed edge to represent an input or output of data. Information of such graph structures can be obtained by analyzing the subject program 21 with the conventional program analysis technique.

The graph structure of the business model (shown on the left side of FIG. 2) has a structure similar to that of the physical model. The vertex of the graph is a business function 52 or logical data 51. The business model and the association model are input by the user at the time of start of system analysis, and thereafter modified by the user on the basis of a difference from a physical model indicated by the function driven analyzer 43 and the data driven analyzer 42. As the initial business model, a rough model that can be known by the user may be used, or a business system or a standard model in the type of application may be used. As the initial association model, an already known rough model may be used.

By the way, in the physical model 22 and the business model 24 shown in FIG. 2, it is supposed that there are no loops along arrows and the execution order of the programs runs along the direction of arrows. Such a supposition typically holds true in a batch system (execution programs and files). In addition, the supposition holds true even in on-line systems or the like, as long as a sequence of executed programs is evaluated and the instance of data is provided with a distinction every update.

In the present embodiment, association of the physical model 22 with the business model 24 is managed using the association model 23. The association model 23 is represented by dotted lines 58 and 59 in FIG. 2. A data structure of the association model 23 is shown in FIG. 5 described later.

FIG. 3 is a diagram showing a data structure example of the physical model 22. A program table 60 and a physical data table 61 shown in FIG. 3 are used to record work states concerning a program 63 and physical data 65 respectively in mark columns 64 and 66 in a retrieval algorithm described later. In the initial state of processing, the mark columns 64 and 66 are cleared to become null. A physical I/O relation table 62 shown in FIG. 3 defines an actual graph structure (input-output relations between a program 67 and physical data 68). For example, a record 71 indicates that physical data FILE-a is input data to a program PGM-x.

FIG. 4 is a diagram showing a data structure example of the business model 24. A business I/O relation table 82 defines a graph structure (logical data 88 corresponding to a business function 87 and an I/O classification 89 indicating whether the logical data is input data or output data).

FIG. 5 is a diagram showing a data structure example of the association model 23. The diagram includes a data association model 91 showing association of logical data 93 with physical data 94 and a function association table 92 showing association of a business function 95 with a program 96. For example, a record 97 in the data association model 91 indicates that logical data "order receiving" is associated with physical data "FILE-a" (it corresponds to the dotted line 58). In the function association model 92, a business function "order receiving registration" is associated with three programs "PGM-x 54, PGM-z 56, PGM-w 57" (it corresponds to the dotted line 59 shown in FIG. 2).

Figure 6:
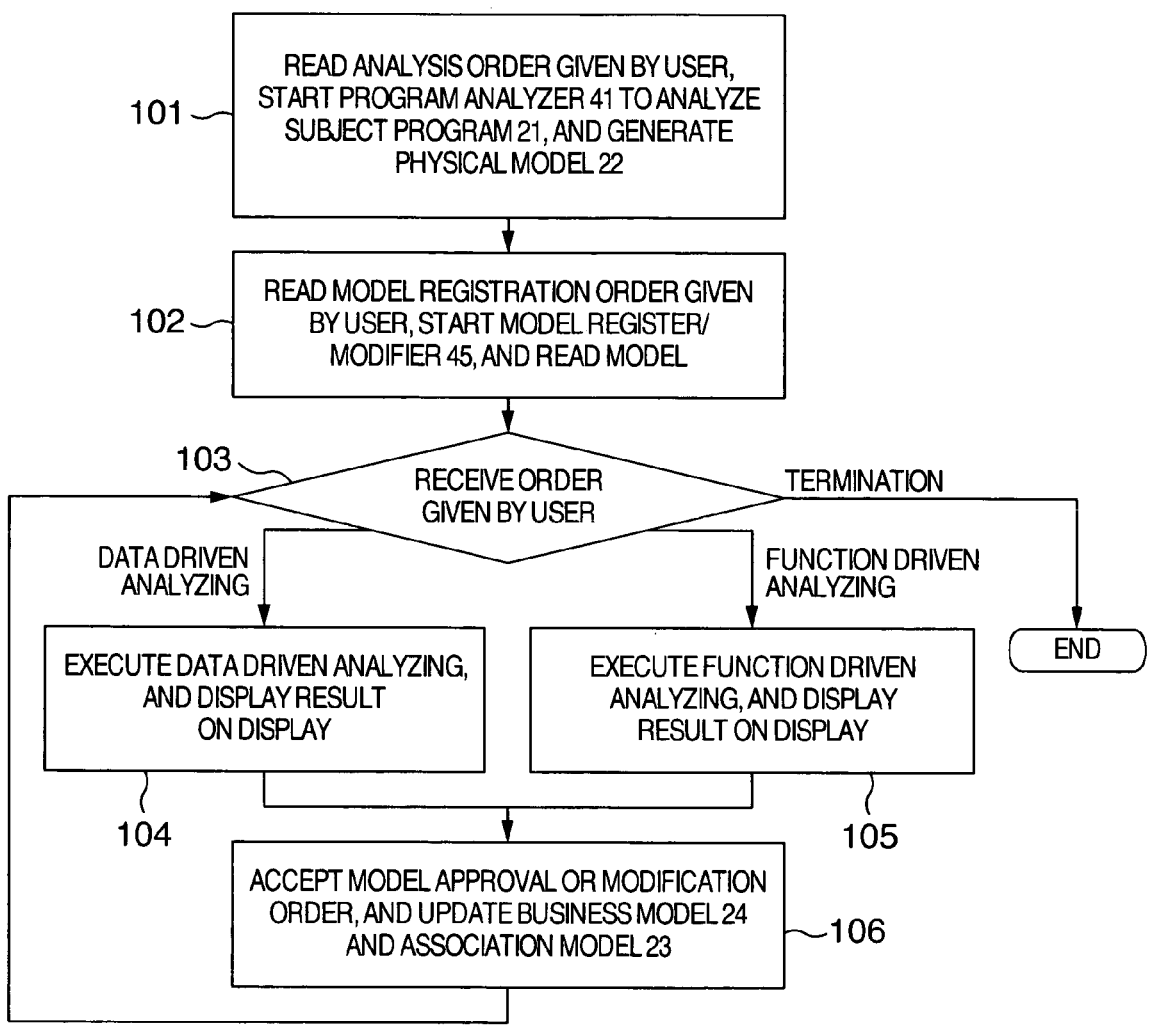
FIG. 6 is a flow chart showing an outline of processing of the present system.

FIG. 6 is a flow chart showing an outline of processing conducted by the system shown in FIG. 1.

First, the controller 40 reads an analysis order given by the user and input from the keyboard 33 or the pointing device 34, starts the program analyzer 41 to analyze the subject program 21, and generates the physical model 22 (step 101). Subsequently, the controller 40 reads a model registration order input by the user, and starts the model register/modifier 45. The model register/modifier 45 reads the business model and the association model input by the user, and registers the business model 24 and the association model 23 (step 102). Subsequently, the controller 40 makes a decision whether the order given by the user is data driven analyzing, function driven analyzing, or termination (step 103).

If the order given by the user is "data driven analyzing" as a result of the decision made at the step 103, then the controller 40 starts the data driven analyzer 42 for a business function specified by the user, and displays a result of processing on a screen (step 104). Here, the data driven analyzer 42 is in the process of extracting a subgraph associated with the specified business function from the physical model, with data of the business model/association model taken as the starting point. Details of the step 104 will be described with reference to FIG. 7.

If the order given by the user is "function driven analyzing" as a result of the decision made at the step 103, then the controller 40 starts the function driven analyzer 43 for a business function specified by the user, and displays a result of processing on a screen (step 105). Here, the function driven analyzer 43 is in the process of extracting a subgraph associated with the specified business function from the physical model, with a function portion of the business model/association model taken as the starting point. Details of the step 105 will be described with reference to FIG. 12.

An input conducted by the user as to whether modification is necessary and a modification method is accepted on the view displayed on the screen at the step 104 or 105. Upon receiving this input, the controller 40 updates the associated business model or association model of the user (step 106), and returns to the state in which an order is accepted (step 103). By thus repeating the process of the steps 103 to 106, the user ascertains the difference between the business model and the physical model, and gives a modification order. As a result, precisions of the business model and the association model can be gradually raised.

Figure 7:
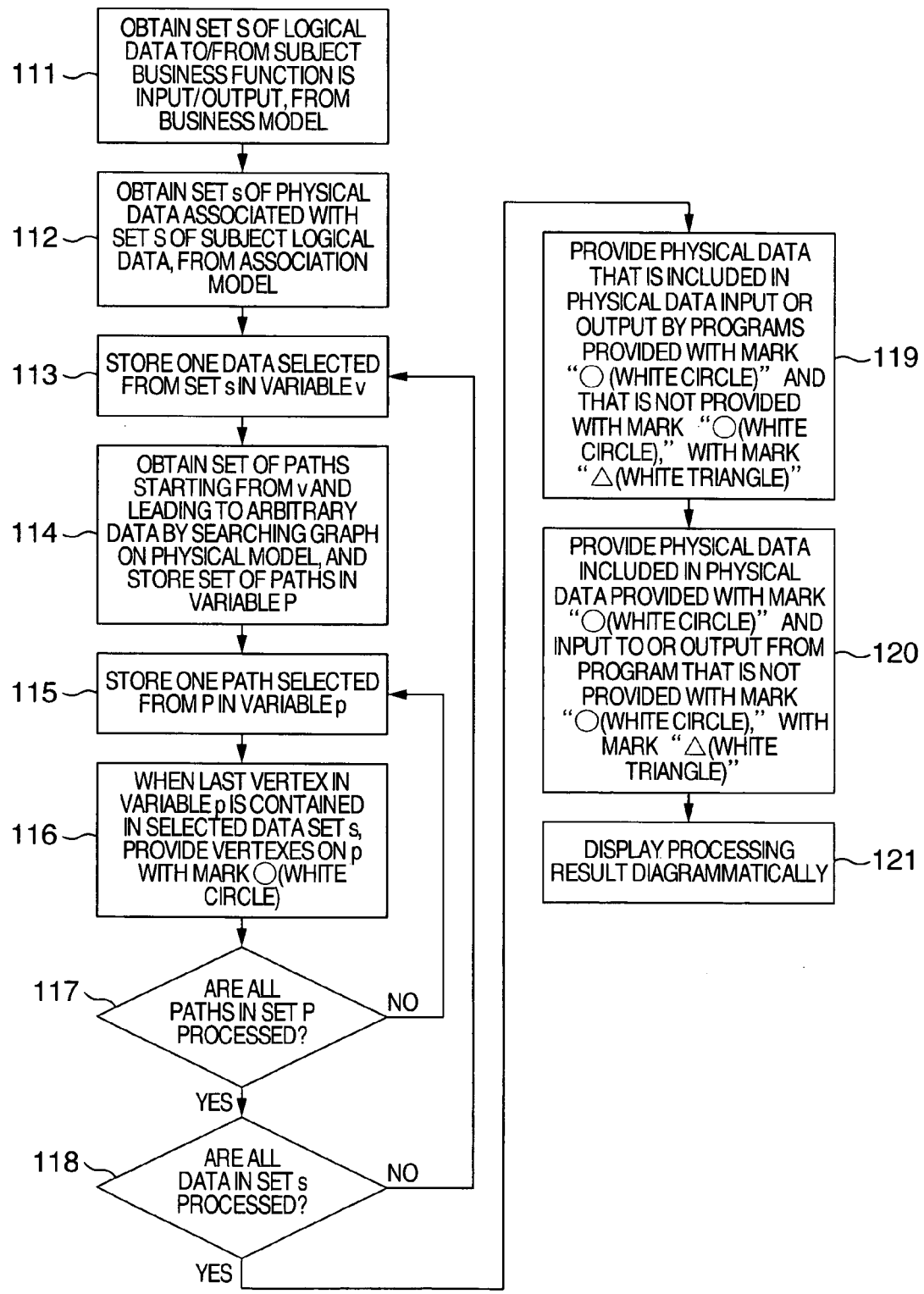
FIG. 7 is a flow chart showing processing conducted at step 104 in FIG. 6 in detail.

FIG. 7 is a flow chart showing details of the step 104 (data driven analyzing) shown in FIG. 6.

First, the data driven analyzer 42 conducts retrieval in the business function column 87 in the business I/O relation table 82 included in the business model 24, and thereby obtains a set S of relating logical data (step 111). For example, if the business function specified by the user is "order receiving registration," the data driven analyzer 42 conducts retrieval in the business function column 87 in the business I/O relation table 82 by using "order receiving registration" as a key, obtains a set S containing three logical data "order receiving," "person in charge," and "order receiving slit," and stores the set S in a storage area in the memory 10.

Subsequently, the data driven analyzer 42 conducts retrieval in the logical data column 93 in the data association model 91 (FIG. 5) by using the set S of logical data extracted at the step 111 as a key, and obtains a set S of physical data associated with the set of subject logical data (step 112). For example, the set S of logical data obtained at the step 111 is S={order receiving, person in charge, order receiving slip}. Therefore, the data driven analyzer 42 conducts retrieval in the logical data column 93 in the data association model 91 by using elements of the set S as a key, and obtains a set s={FILE-a, FILE-c} of physical data (in the example shown in FIG. 5, the case where physical data associated with the logical data "person in charge" is unknown is supposed). In addition, the data driven analyzer 42 stores the s in a storage area in the memory 10.

Subsequently, the data driven analyzer 42 selects one data from the set s of physical data obtained at the step 112, and stores the data in a variable v contained in a storage area in the memory 10 (step 113). Subsequently, the data driven analyzer 42 conducts retrieval in a direction of arrows along edges of a graph on the physical model by taking physical data specified by the variable v as the starting point, obtains a set of paths starting from the physical data v and leading to arbitrary data on the graph, and stores the set of the paths in a variable P contained in a storage area in the memory 10 (step 114). For example, supposing FILE-a in the graph shown in FIG. 2 to be the staffing point, the set P of paths obtained at the step 114 becomes P={(FILE-a), (FILE-a→PGM-x→FILE-n), (FILE-a→PGM-x→FILE-m), (FILE-a→PGM-x→FILE-n→PGM-y→FILE-o), (FILE-a→PGM-x→FILE-m→PGM-z→FILE-d), (FILE-a→PGM-x→FILE-n→PGM-y→FILE-o→PGM-w→FILE-c), and (FILE-a→PGM-x→FILE-m→PGM-z→FILE-d→PGM-w→FILE-c}.

Subsequently, the data driven analyzer 42 stores one path selected from the variable P obtained at the step 114 in a variable p contained in a storage area in the memory 10 (step 115). If the last vertex in the variable p is contained in the data set S obtained at the step 112, all vertexes on the path p selected at the step 115 are provided with o (white circle) (step 116). Here, vertexes mean physical data and programs included in a certain path. For example, as for "FILE-a→PGM-x→FILE-n→PGM-y→FILE-o→PGM-w→FILE-c," the last vertex "FILE-c" is contained in the set s. With respect to "FILE-a, PGM-x, FILE-n, PGM-y, FILE-o, PGM-w, and FILE-c" which are vertexes on this path, therefore, "o (white circle)" is stored in the mark columns 64 and 66 of associated records in the program table 60 and the physical data table 61 (FIG. 3).

Processing at the steps 115 and 116 is conducted on all paths contained in the variable P obtained at the step 114 (step 117). In addition, processing at the steps 113 to 117 is conducted on all physical data contained in the set s obtained at the step 112 (step 118). For example, if processing is executed on the graph shown in FIG. 8 taking {FILE-a, FILE-c} as a set at the start port of physical data, then "o (white circle)" is stored in the mark columns 64 and 66 associated with "FILE-a, PGM-x, FILE-n, FILE-m, PGM-y, PGM-z, FILE-o, FILE-d, PGM-w, and FILE-c" in the program table 60 and the physical data table 61.

Subsequently, the data driven analyzer 42 provides physical data that is included in physical data input or output by programs provided with "O (white circle)" at the step 116 and that is not provided with the mark "o (white circle)," with a mark "Δ (white triangle)" (step 119). In the example shown in FIG. 8, the FILE-b comes under the condition (an input program of the FILE-b is not provided with the mark "o (white circle)"). The mark "Δ (white triangle)" is stored in the mark column 66 of a record associated with the "FILE-b" in the physical data table 61. It is inferred that a specified business function is input to and output from this vertex "FILE-b." However, the vertex "FILE-b" is lacking in the business model and the association model at the current point in time.

Figure 8:
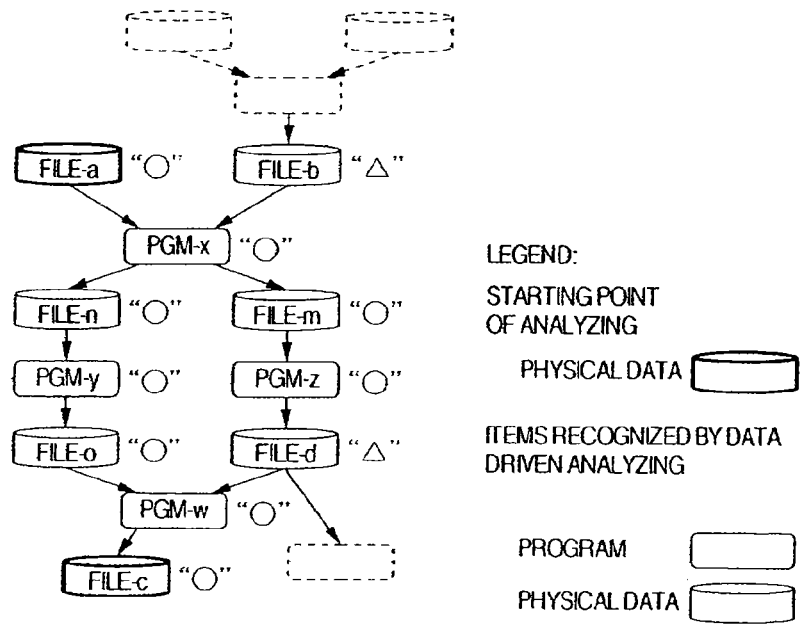
FIG. 8 shows an example of a subgraph selected by data driven analyzing shown in FIG. 7.

Subsequently, the data driven analyzer 42 provides physical data included in physical data provided with the mark "o (white circle)" at the step 116 and input to or output from a program that is not provided with the mark "o (white circle)," with a mark "Δ (white triangle)" (step 120). In the example shown in FIG. 8, the physical data FILE-d comes under the condition (there is another program having the physical data FILE-d as input data, besides the PGM-w). It is inferred that a specified business function is input to and output from this vertex. However, this vertex is lacking in the business model and the association model at the current point in time. FIG. 8 shows vertexes provided with marks by the data driven analyzing. They represent a subgraph recognized by the data driven analyzing conducted at steps 111 to 121 shown in FIG. 7.

Finally, the display unit 44 transmits a subgraph of a result of processing conducted up to step 120 to the display apparatus. The display apparatus diagrammatically displays the subgraph of the result of processing (step 121). FIG. 8 shows vertexes provided with marks by the data driven analyzing. At this time, information representing relation to the business model is also displayed together. It is indicated whether a program contained in the subgraph and physical data located at ends of the subgraph matches the business model/association model.

Figure 9:
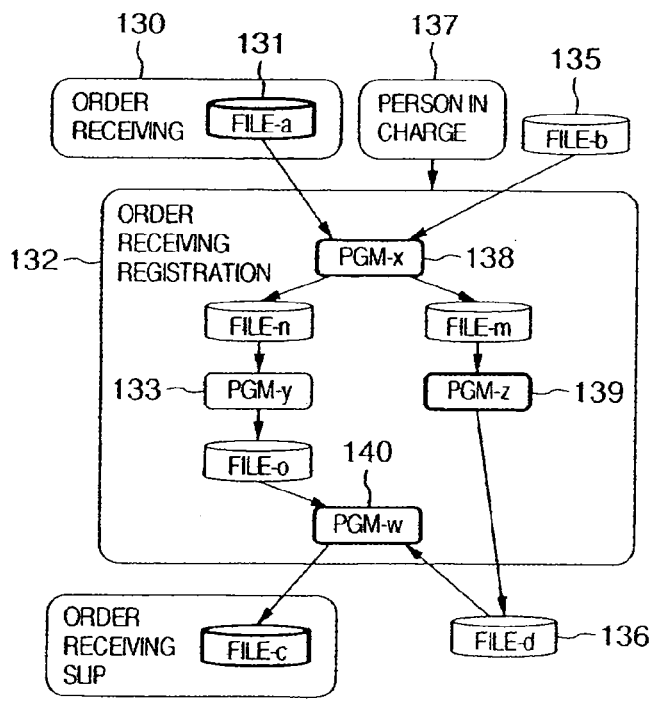
FIG. 9 is a diagram showing a screen example of a result obtained by conducting processing shown in FIG. 7 and displayed on a display apparatus.

FIG. 9 shows a screen example of the processing result displayed at the step 121 shown in FIG. 7. A frame line 130 represents logical data "order receiving." A figure 131 indicating physical data FILE-a surrounded by the frame line 130 indicates that the logical data "order receiving" and the physical data FILE-a are represented by the association model (the record 97 in the data association table 91 shown in FIG. 5). On the other hand, lack of such a frame in figures 135 and 136 respectively representing physical data FILE-b and FILE-d indicates that they are not associated with the business models (FIG. 5). Lack of a figure representing physical data inside a frame line 137 representing logical data "person in charge" indicates that physical data associated with the logical data "person in charge" is unknown, that is, information representing associated physical data is not present in the data association model (a record 98 in the data association model 91 shown in FIG. 5).

A frame line 132 represents a business function "order receiving registration." Figures indicating physical data and programs surrounded by the frame line 132 represent physical data and programs processed by the data driven analyzing (FIG. 7). For example, figures 138, 139 and 140 respectively associated with programs PGM-x, PGM-z and PGM-w are highlighted because they coincide with the association model at the current point in time. A FIG. 133 associated with PGM-y is not highlighted because the PGM-y is a program processed by the data driven analyzing, but the PGM-y is not associated with the business model.

The user ascertains such a screen, and makes a decision as to whether modification is necessary and as to the modification method. For example, the user's modification order supposed in the example shown in FIG. 9 is as follows:

(1) Associate the program PGM-y with the business function "order receiving registration."

(2) Associate the physical data FILE-b with logical data "person in charge."

(3) Register logical data "inquiry about appointed date of delivery" in business model as new output data, and associate the physical data FILE-d with the logical data "inquiry about appointed date of delivery."

The controller 40 reads such an order given by the user, from the pointing device 34 such as a mouse. The data driven analyzer 42 conducts update processing of the business model and the association model at the step 116 in FIG. 7. FIGS. 8 and 9 show examples of the case where logical data is lacking in the business model or the association model is unknown even if logical data is recognized.

Figure 10:
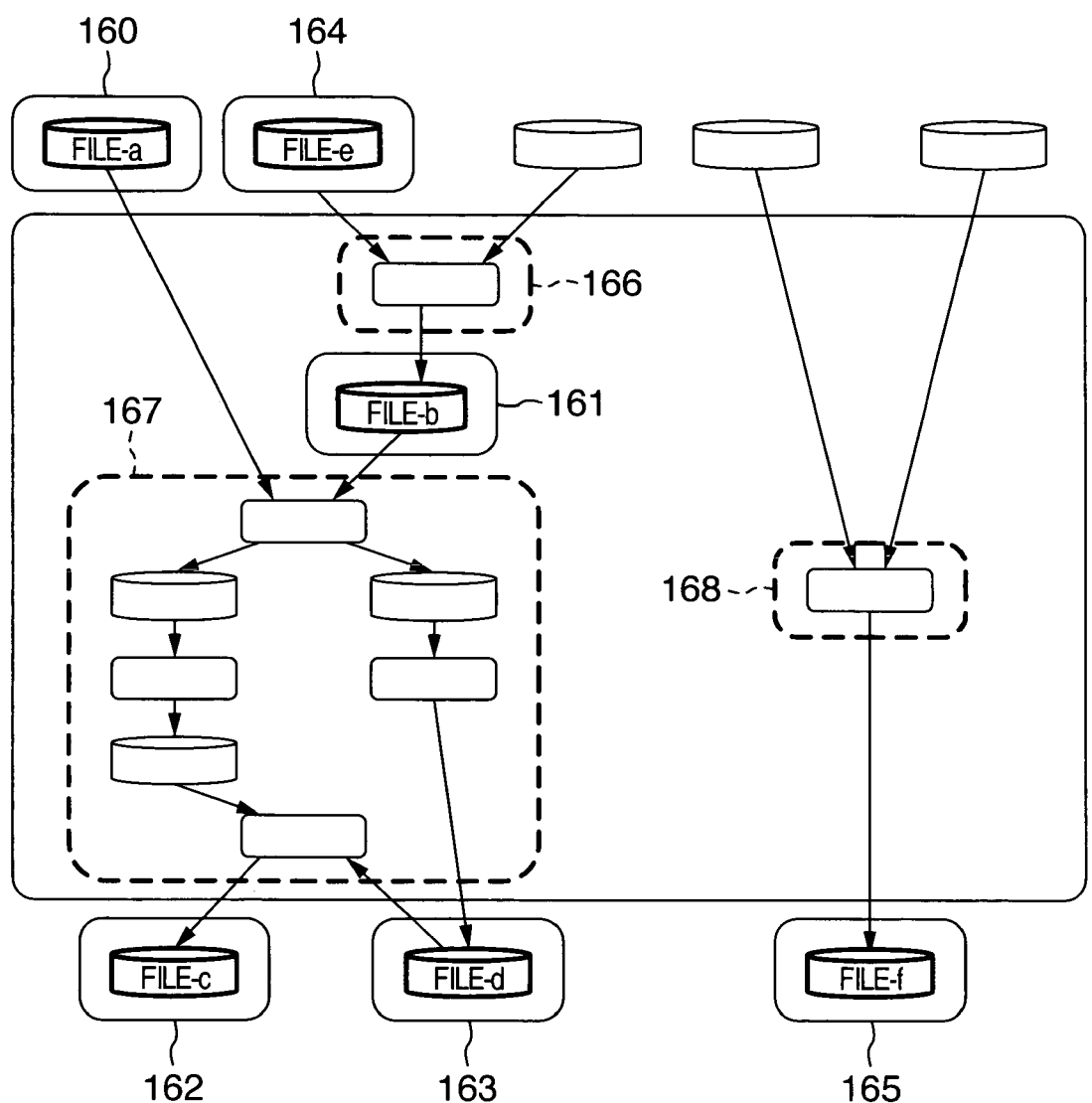
FIG. 10 is a diagram showing another screen-example of a result obtained by conducting processing shown in FIG. 7 and displayed on a display apparatus.

FIG. 10 is an example showing another pattern of the business model and the physical model. It is now supposed that physical data "FILE-e" 164 and "FILE-f" 165 are additionally specified as shown in FIG. 10, although four physical data "FILE-a" 160, "FILE-b" 161, "FILE-c" 162 and "FILE-d" 163 are required originally. If the data driven analyzing (FIG. 7) is conducted in such a situation, a graph is divided into a plurality of graphs having a subset in a specified set of physical data as a vertex at an end. Such subgraphs are represented by dotted frame lines 166, 167 and 168 in FIG. 10. In other words, in FIG. 10, whether some physical data is incorporated in a business flow or has no relation to a business flow is discriminated on the screen.

Subgraphs as shown in FIG. 10 can appear not only in the case where extra data is incorporated in the business model, but also in the case where the grain of the business function in the business model is coarse as compared with the actual grain and more detailed division is possible. Discrimination of such a subgraph can be conducted by placing an identifier, which represents a connected component of the graph, in a mark column when providing marks in the data driven analyzing.

Figure 11:
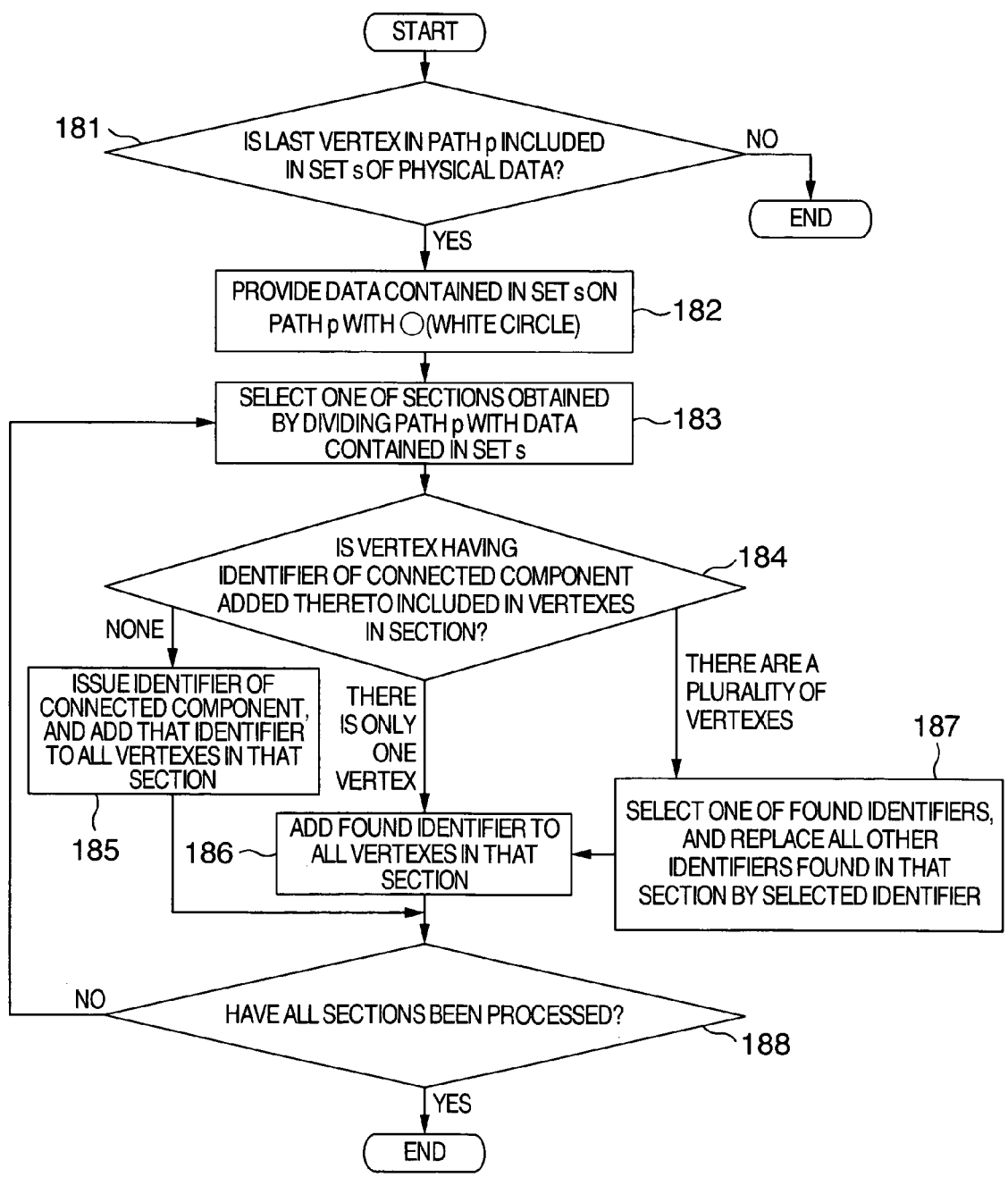
FIG. 11 is a flow chart showing processing conducted at step 116 to judge a connected component of a subgraph.

FIG. 11 is a flow chart showing processing conducted at the step 116 in the data driven analyzing (FIG. 7) with the data and graph shown in FIG. 10.

First, the data driven analyzer 42 makes a decision whether the last vertex in the path p is included in the specified set s of physical data (step 181). If the last vertex in the path p is not included, the processing is finished. If the last vertex in the path p is included, the data driven analyzer 42 stores o (white circle) in the mark column 66 in the physical data table 61 associated with vertexes that are elements of the set s of physical data contained on the path p (step 182), and selects one of sections obtained by dividing the path p with elements of the set s (step 183).

The data driven analyzer 42 examines vertexes in the section selected at the step 183, and determines whether a vertex having an identifier of a connected component added thereto is included in the vertexes (step 184). If a vertex having an identifier added thereto is not present, the data driven analyzer 42 issues a new identifier, and adds the new identifier to all vertexes in that section (step 185). If a vertex having an identifier added thereto is present and only one identifier is used in the whole section, the data driven analyzer 42 adds this identifier to all vertexes in the section (step 186). If there are a plurality of identifiers in the section, the data driven analyzer 42 selects one of the identifiers and replaces other identifiers by the selected identifier (step 187). By the way, the identifier replacing processing is conducted on the whole physical model. Thereafter, the data driven analyzer 42 adds the selected identifier to all vertexes in the subject section (step 187).

Until an unprocessed section on the path p disappears, the data driven analyzer 42 conducts the processing of the steps 183 to 187 (step 188). Owing to the processing heretofore described, it is possible to set an identifier for vertexes inside the subgraph every connected component, and display as shown in FIG. 10 becomes possible. By displaying dotted lines shown in FIG. 10 on the display apparatus, the user can ascertains extra specified data and divisible business functions, and give the following orders.

(1) Delete a business model and an association model associated with the physical data FILE-e.

(2) Delete a business model and an association model associated with the physical data FILE-f.

(3) Divide the business function into ranges surrounded by the frame lines 166, 167 and 168, and associate programs contained in the ranges with functions obtained by the division.

The controller 40 reads such an order given by the user, from the pointing device 34 such as a mouse. The data driven analyzer 42 conducts update processing of the business model and the association model at the step 116 in FIG. 7.

Figure 12:
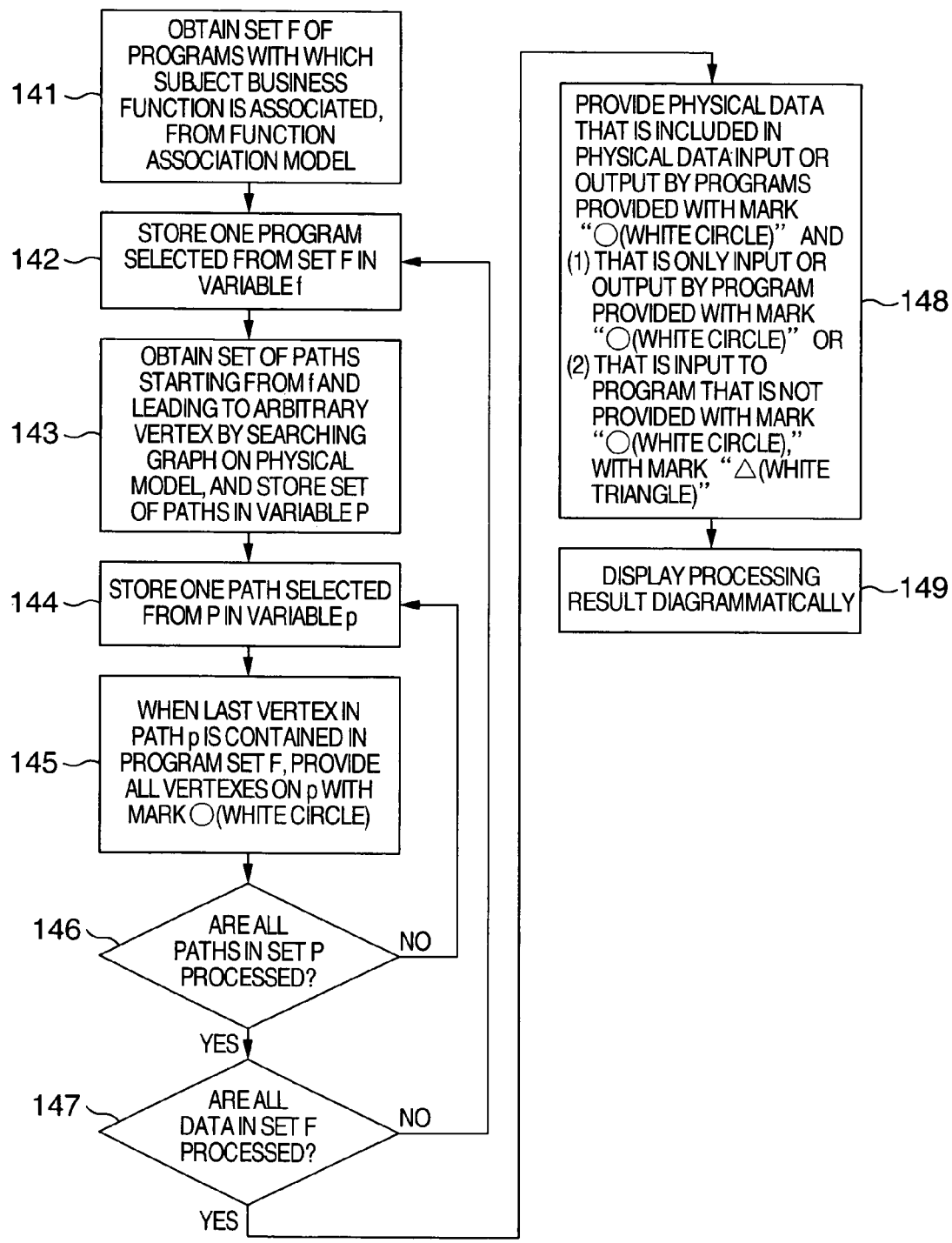
FIG. 12 is a flow chart showing processing conducted at step 105 shown in FIG. 6 in detail.

FIG. 12 is a flow chart showing details of the processing (function driven analyzing) conducted at the step 105 in FIG. 6.

First, the function driven analyzer 43 conducts retrieval in the business function column 95 in the function association table 92 by using a business function specified by the user, and thereby obtains a set F of programs with which the subject business function is associated (step 141). For example, if the specified business function is "order receiving registration," contents of the set F become F={PGM-x, PGM-z, PGM-w} as shown in FIG. 5.

Subsequently, the function driven analyzer 43 selects one program from the set F, and stores the program in a variable f contained in a storage area in the memory 10 (step 142). The function driven analyzer 43 conducts retrieval in a direction of arrows along edges of a graph on the physical model by taking physical data f as the starting point, obtains a set of paths starting from f and leading to an arbitrary vertex, and stores the set of the paths in a variable P contained in a storage area in the memory 10 (step 143).

Figure 13:
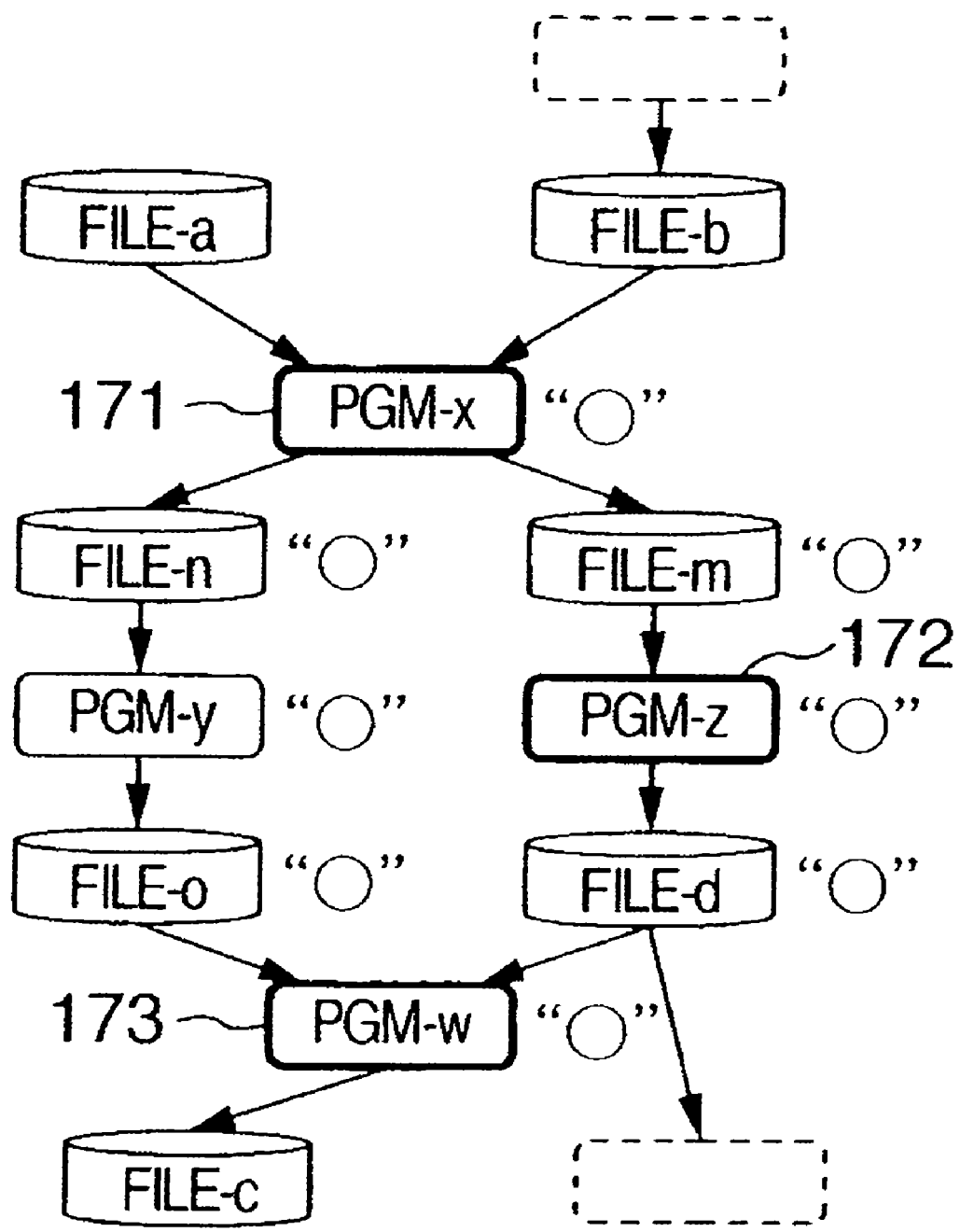
FIG. 13 shows an example of a subgraph selected by function driven analyzing shown in FIG. 6.

The function driven analyzer 43 takes one path from the set P of the paths obtained at the step 143, and stores the path in a variable p contained in a storage area in the memory 10 (step 144). If the last vertex in the path p is contained in the program set F obtained at the step 141, the function driven analyzer 43 stores o (white circle) in the mark columns 64 and 66 of records associated with physical models (the program table 60 or the physical data table 61) of all vertexes (programs or physical data) on the path p (step 145). The function driven analyzer 43 conducts processing at the steps 144 to 145 on all paths contained in the variable P obtained at the step 143 (step 146). In addition, the function driven analyzer 43 conducts processing at the steps 141 to 146 on all physical data contained in the set F obtained at the step 140 (step 147). If processing is executed on the graph shown in FIG. 13 taking {PGM-x 171, PGM-z 172, PGM-w 173} as a set of programs, then "o (white circle)" is entered in the mark columns of records associated with "PGM-x, FILE-n, FILE-m, PGM-y, PGM-z, FILE-o, FILE-d, PGM-w" in the program table 60 and the physical data table 61 (step 145). These vertexes are presumed to be associated with the specified business function.

Subsequently, the function driven analyzer 43 provides physical data that is included in physical data input or output by programs provided with the mark "o (white circle)" at the step 145 and (1) that is only input or output by a program provided with the mark "o (white circle)" or (2) that is input to a program that is not provided with the mark "o (white circle)," with a mark "Δ (white triangle)" (step 148). For example, in FIG. 13, the function driven analyzer 43 provides the FILE-a, FILE-b and FILE-c with the mark "Δ (white triangle)." The vertexes provided with the mark become candidates for input and output data of the specified business function. Owing to the function driven analyzing described heretofore, subgraphs corresponding to the specified business function can be picked out.

Finally, the function driven analyzer 43 transmits a subgraph obtained by the processing conducted at the steps 141 to 148 to the display apparatus 32. The display apparatus 32 displays the subgraph of the processing result in the same way as FIG. 12 (step 149). The user ascertains the display, and the function driven analyzer 43 conducts updating of the business model and the association model.

As heretofore described, the business specification generation assisting system according to the present embodiment can assist the process of understanding an information system including a large number of programs on the basis of the technique of the program analysis.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A business specification generation assisting system for assisting generation of a business specification that implements business function specified by a user on the basis of programs to be analyzed, the business specification generation assisting system comprising:
 a central processing unit (CPU);
 a memory coupled with the CPU; and
 a storage device coupled with the memory, the storage device comprising:
  a physical model database for storing therein input and output relations between programs to be analyzed and physical data associated with the programs;
  a business model database for storing therein association of the business functions with logical data concerning the business functions; and
  an association model database for storing therein association of the physical data with the logical data and association of the business functions with programs used to execute the business functions, wherein
 the memory comprises a data driven analyzer responsive to a specified business function specified by a user, for acquiring logical data associated with the specified business function from said business model database, acquiring physical data associated with the acquired logical data from said association model database, acquiring paths starting from the acquired physical data and including other physical data and programs on the basis of input-output relations between programs and physical data stored in said physical model database, determining programs and physical data corresponding to the specified business function based on the acquired paths, and generating a relation diagram between the determined programs and the specified business function and a relation diagram between the determined physical data and the specified business function associated based on the association model database and the acquired paths.

2. A business specification generation assisting system according to claim 1, wherein a terminus of the acquired paths is physical data.

3. A business specification generation assisting system according to claim 1, wherein the acquired physical data comprises a set of physical data,
 the acquired paths comprise a set of paths where each path starts from any one of the acquired physical data, and the data driven analyzer is configured to specify a path which has a terminus corresponding to any one of the acquired physical data in the acquired paths, and
 if any path is specified in the acquired paths, a program and physical data included in the specified path are specified as the program and physical data associated with the specified business function.

4. A business specification generation assisting system according to claim 3, wherein said data driven analyzer is further configured to store in said physical model database said determined program and physical data corresponding to the specified business function with a predetermined mark.

5. A business specification generation assisting system according to claim 4, further comprising a display unit for displaying information associating said physical data and programs stored in said physical model database with said mark as the relation diagram.

6. A business specification generation assisting system according to claim 5, wherein
 said data driven analyzer is further configured to receive instructions for associating a program not having any mark with a business function and instructions for associating physical data not having any mark with logical data, and execute associating operation in accordance with the received instructions.

7. A business specification generation assisting system according to claim 5, wherein said display unit is configured to display physical data not having said mark and being inputted to or outputted from a program having at least one of said mark, and to display physical data having said mark and being inputted or outputted from a program not having said mark, by associating with a different mark.

8. A business specification generation assisting system according to claim 5, wherein said display unit is configured to display logical data and physical data associated with said logical data are respectively surrounded by the same type of lines, and a program and physical data specified as the program and physical data associated with the specified business function are surrounded by the same type of lines as the line surrounding said specified business function.

9. A computer-readable storage medium, in which a program for executing a business specification generation assisting method used in a business specification generation assisting system for assisting generation of a business specification that implements business function specified by a user on the basis of programs to be analyzed is, the business specification generation assisting method comprising the steps of:
 causing a physical model database to store input and output relations between programs to be analyzed and physical data associated with the programs;
 causing a business model database to store association of the business functions with logical data concerning the business functions;
 causing an association model database to store association of the physical data with the logical data and association of the business functions with programs used to execute the business functions; and
 causing a data driven analyzer to be responsive to a specified business function specified by a user, for acquiring logical data associated with the specified business function from the business model database, acquiring physical data associated with the acquired logical data from the association model database, acquiring paths starting from the acquired physical data and including other physical data and program on the basis of input-output relations between programs and physical data stored in said physical model database, determining programs and physical data corresponding to the specified business function on the basis of the acquired paths, and generating a relation diagram between the determined programs and the specific business function and a relation diagram between the determined physical data and the specified business function associated based on the association model database and the acquired paths.

10. A computer-readable storage medium according to claim 9, wherein a terminus of the acquired paths is physical data.

11. A computer-readable storage medium according to claim 9, wherein the acquired physical data comprises a set of physical data, and the acquired paths comprise a set of paths where each path staffs from any one of the acquired physical data, the method further comprising the steps of:

causing said data driven analyzer to specify a path which has a terminus corresponding to any one of the acquired a set of physical data in the acquired a set of paths, and if any path is specified in the acquired a set of paths, specifying a program and physical data included in the specified path as the program and physical data associated with the specified business function.

12. A computer-readable storage medium according to claim 11, wherein the method further comprises the step of causing said data driven analyzer to store in said physical model database said program and physical data specified as the program and physical data associated with the specified business function with associating by a predetermined mark.

13. A computer-readable storage medium according to claim 12, wherein said system comprises a display unit, the method further comprising the step of displaying information associating said physical data and programs stored in said physical model database with said mark as the relation diagram on said display unit.

14. A computer-readable storage medium according to claim 13, wherein the method further comprising the steps of:

causing said data driven analyzer to receive instructions for associating a program not having any mark with a business function and instructions for associating physical data not having any mark with logical data, and execute associating operation in accordance with the received instructions.

15. A computer-readable storage medium according to claim 13, wherein said display unit is configured to display physical data not having said mark and being inputted to or outputted from a program having at least one of said mark and to display physical data having said mark and being inputted to or outputted from a program not having said mark, by associating with a different mark.

16. A computer-readable storage medium according to claim 13, wherein said display unit is configured to display logical data and physical data associated with said logical data respectively surrounded by the same type of lines, a program and physical data specified as the program and physical data associated with the specified business function are surrounded by the same type of lines as the line surrounding said specified business function.

* * * * *